United States Patent Office 3,020,821
Patented Feb. 13, 1962

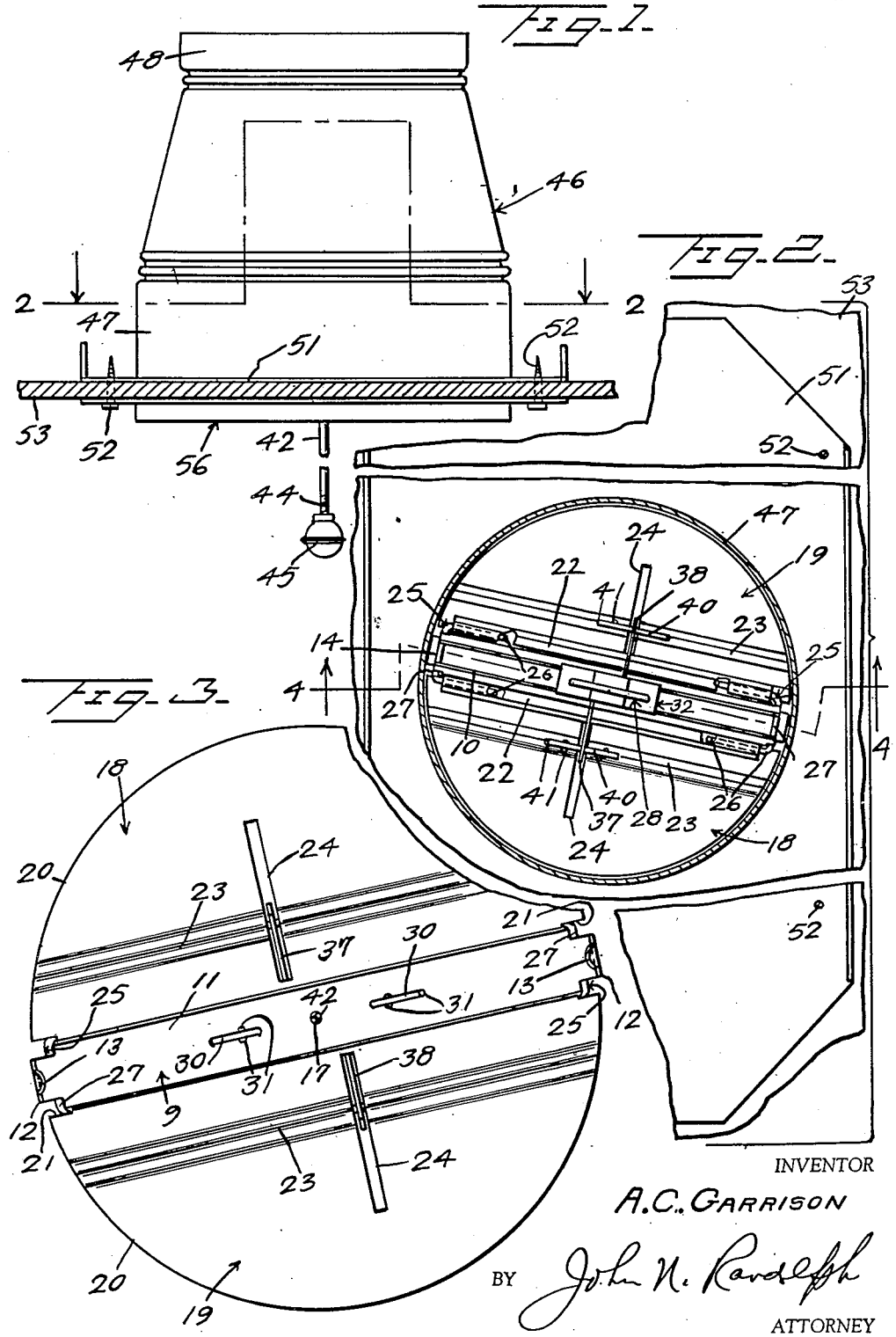

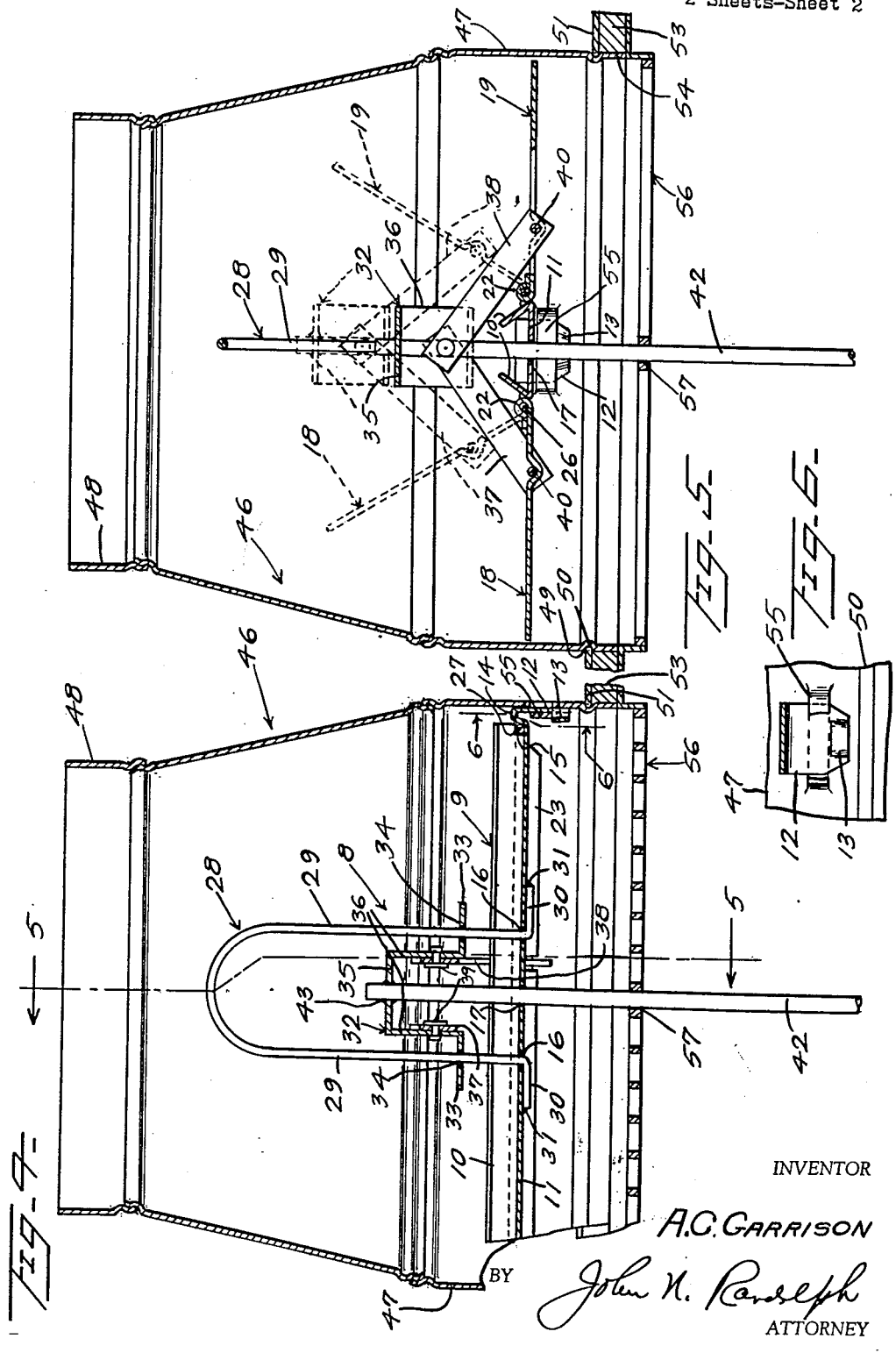

3,020,821
DAMPER ASSEMBLY
Alton C. Garrison, 2902 Carters Ferry Road,
Marshall, Tex.
Filed Aug. 22, 1960, Ser. No. 51,140
5 Claims. (Cl. 98—41)

This invention relates to a damper assembly of extremely simple construction capable of being readily mounted in an open end of a conduit and which is manually adjustable for regulating the flow of air through said conduit.

More particularly, it is an object of the present invention to provide a damper assembly primarily adapted for use for controlling the air passing through short conduits or boots such as are utilized for admitting cold or hot air to a room or enclosure through a ceiling.

Still a further object of the invention is to provide a damper assembly which may be readily constructed in various sizes and which is capable of being quickly and easily mounted in existing conduits utilized for admitting cold or hot air to an enclosure or for the escape of air therefrom.

Various other objects and advantages of the invention will hereinafter become more fully apparent from the following description of the drawings, illustrating a presently preferred embodiment thereof, and wherein:

FIGURE 1 is an elevational view, partly in section, showing a conduit member mounted in and extending through a ceiling and in which the damper assembly is contained;

FIGURE 2 is a horizontal sectional view thereof, taken substantially along the line 2—2 of FIGURE 1;

FIGURE 3 is an enlarged fragmentary bottom plan view of the damper assembly, shown removed from the conduit;

FIGURE 4 is an enlarged fragmentary vertical sectional view, taken substantially along the line 4—4 of FIGURE 2;

FIGURE 5 is a fragmentary vertical sectional view, taken substantially along the line 5—5 of FIGURE 4, and FIGURE 6 is a fragmentary sectional view taken substantially along the line 6—6 of FIGURE 4.

Referring more specifically to the drawings, the damper assembly in its entirety and comprising the invention is designated generally 8 and includes an elongated frame member, designated generally 9. The frame member 9 is formed from a single elongated strip, preferably of sheet metal, having corresponding side edge portions which are bent upwardly and inwardly to provide corresponding reinforcing flanges 10 for a bar portion 11 which is disposed therebetween. The upper free edges of the reinforcing flanges 10 terminate in spaced apart relation to one another, as best seen in FIGURE 5, and said bar portion 11 extends beyond the ends of the flanges 10 and has corresponding depending end portions 12. The lower extremities of the end portions 12 are each slit transversely or horizontally and pressed inwardly to provide an inwardly offset enlargement 13, for a purpose which will hereinafter be described. Each depending end portion 12 joins with an adjacent end of the bar portion 11 by an upwardly offset connecting portion 14. As best seen in FIGURE 4, the reinforcing flanges 10 are provided at their ends with notches 15 which are located adjacent the plane of the bar portion 11 and beyond which the upwardly offset portions 14 are disposed. The bar portion 11 is provided with two longitudinally spaced openings 16 and a larger opening 17. The opening 17 is disposed midway of the ends of the frame 9 and midway between the openings 16.

The damper assembly 8 includes two corresponding semi-ovate damper plates or blades 18 and 19, each having an arcuate outer edge 20 and a substantially straight inner edge 21. The inner edge 21 of each damper plate has an extension which is bent back upon itself to provide a sleeve 22. The sleeves 22 are disposed substantially in alignment with the inner edges 21 and extend to adjacent the ends thereof, as best seen in FIGURE 2. Each damper plate has a reinforcing portion in the form of a groove 23 of approximately V-shape cross section, said grooves being disposed substantially parallel to the sleeves 22. Each damper plate has an elongated slot 24. Said slots 24 are disposed crosswise of and intersect the grooves 23 and are disposed in offset relation to one another, as seen in FIGURES 2 and 3.

The damper plates 18 and 19 straddle the supporting frame 9 and are pivotally connected thereto by two U-shaped rod members 25, each comprising two laterally spaced substantially parallel legs 26 connected by an intermediate portion 27. The legs 26 of one of the members 25 engage in corresponding ends of the two sleeves 22 and the legs 26 of the other member 25 engage in the other ends of said sleeves, each of said legs 26 being of a length less than one-half the length of each of the sleeves 22. The intermediate portions 27 extend across and bear upon the bar portion 11 and engage in the notches 15 and are confined in said notches by the upwardly extending connecting portions 14, as best seen in FIGURE 4. Said portions 27 are applied to the notches 15 before the ends of the bar portion 11 are bent to form the upwardly extending connecting portions 14, and after said connecting members 25 have been connected to the damper plates 18 and 19. The legs 26 have a sufficiently loose fitting engagement in the sleeves 22 so that said sleeves can turn thereon for pivotally connecting the damper plates to the frame 9.

A substantially arch shaped rod 28 has spaced apart substantially parallel legs 29 which extend downwardly through the openings 16. The lower distal ends of the legs 29 are bent outwardly, as seen at 30, to bear against the underside of the bar portion 11, to which said terminals are secured, as by wedling, as seen at 31. Accordingly, the arch shaped member 38 as supported by and extends upwardly from the frame 9 between the damper plates 18 and 19. A crosshead 32, preferably formed from a single strip of metal, has substantially coplanar ends 33 which are provided with openings 34 through which the legs 29 loosely extend. The crosshead 32 has an upwardly offset intermediate portion 35 and upright substantially parallel sides 36, which extend between said intermediate portion 35 and the terminal portions 33. The portions 35 and 36 of the crosshead 32 are disposed between the legs 29 and spaced therefrom.

Complementary ends of two links 37 and 38 are pivotally connected, one to each of the sides 36, by pivot fastenings 39. The links 37 and 38 extend downwardly and outwardly in opposite directions from the crosshead 32 and have opposite ends engaging loosely in the slots 24 of the damper plates 18 and 19, respectively. Pivot pins 40 extend loosely through the lower ends of the links 38 and have end portions which are secured in the damper plate grooves 23, as by welding, as indicated at 41, for pivotally connecting the links to the damper plates.

An actuating rod 42 extends slidably through the opening 17 and has one end extending centrally through and secured to the intermediate portion 35 by welds 43. The actuating rod 42 has a threaded opposite end 44 to which a knob or handle 45 is detachably connected, as seen in FIGURE 1.

The damper assembly 8, as previously described, is adapted to be mounted in a short conduit 46, for example, of circular cross section, having open ends including an end 47 which may be somewhat larger than the other end 48. The conduit portion 47 has an inwardly offset outwardly opening annular groove 49 which is mounted in an opening 50 of a mounting plate 51, which is shown secured by fastenings 52 to an upper face of a ceiling 53, around an opening 54 thereof. The extremity of the conduit end portion 47 fits in said opening 54, as seen in FIGURES 4 and 5. The conduit portion 47 is slit circumferentially to provide two circumferentially extending inwardly bent loop portions 55 which are disposed in opposed relation to one another.

The damper assembly 8 can be readily inserted upwardly into the conduit portion 47, with the damper blades 18 and 19 in partially open positions, as illustrated in FIGURE 5 in dotted lines, after which said assembly can be turned to position the depending ends 12 above the loops 55. The assembly 8 can then be displaced downwardly to cause said ends 12 to pass downwardly through said loops or mounting elements 55 and until the enlargements 13 are disposed below said loops 55. The loops 55 are then deformed outwardly to engage the depending ends 12 above the enlargements 13, as seen in FIGURE 4, for interlocking the frame 9 to the conduit portion 47.

Any conventional form of grille 56, having a central opening 57 in which the actuating rod 42 can be loosely accommodated, can be engaged with said rod and disposed over the opening 54, and may be secured to the underside of the ceiling 53 by certain of the fastenings 52, as seen in FIGURE 1. After the grille 56 has been applied, the knob or handle 45 can be connected to the rod end 44.

With the damper plates 18 and 19 disposed substantially coplanar to one another and to the bar 11, as seen in FIGURES 2 and 5, said damper assembly is in a closed position so that substantially no air can pass through the conduit 46. To open the damper unit 8, a pushing force is exerted on the knob 45 in a direction axially of the rod 42 for causing said rod to slide upwardly through the grille 56 and frame 9 to displace the crosshead 32 upwardly along the arch shaped rod 28 which provides a guide for reciprocating movement of said crosshead. As the crosshead 32 moves upwardly from its full line toward and beyond its dotted line position of FIGURE 5, the links 37 and 38 are drawn upwardly to thereby exert an upward pull on the damper plates 18 and 19, for causing said damper plates to swing about their pivots 26 in moving from their full line to their dotted line positions of FIGURE 5. The dampers 18 and 19 are shown in dotted lines in a partially open position, and it will be readily apparent that the crosshead 32 may be displaced upwardly beyond its dotted line position for moving the damper plates to fully open positions, in which said damper plates are disposed substantially parallel to one another or in slightly upwardly converging relation to one another. It will likewise be readily obvious that a downward pull on the knob 45 will displace the crosshead 32 downwardly toward its position of FIGURE 4 and its full line position of FIGURE 5 for causing the links 37 and 38 to exert an outward and downward pushing force on the damper plates 18 and 19 to swing said damper plates downwardly to co-planar closed positions.

Various modifications and changes are contemplated and may be resorted to, without departing from the function or scope of the invention as hereinafter defined by the appended claims.

I claim as my invention:

1. A damper assembly comprising an elongated frame adapted to be disposed within a conduit and having a bar portion spanning the conduit and end portions disposed at an angle to the bar portion, means anchoring said end portions to the conduit with the plane of the bar portion disposed normal to the axis of the conduit, a pair of damper plates, means pivotally connecting said damper plates to said frame for mounting the damper plates in positions straddling the bar portion, a guide member including spaced substantially parallel legs supported by said frame within the conduit and disposed perpendicular to the bar portion and substantially parallel to the axis of the conduit, a crosshead having substantially coplanar apertured portions slidably engaging said legs and mounting the crosshead on the guide member for reciprocating movement of the crosshead toward and away from the frame, said crosshead having substantially parallel portions disposed between and spaced from said legs, a pair of links having adjacent ends pivotally connected to said substantially parallel portions and remote ends pivotally connected to the damper plates, and an actuating rod extending slidably through said bar portion between the legs of the guide member and having one end secured to the crosshead, between said substantially parallel portions, and an opposite end disposed beyond an end of said conduit, said actuating rod being adapted to be manually actuated for moving the rod and crosshead longitudinally of the guide member for exerting a pulling or a pushing force on the links for swinging the damper plates relative to the frame between open and closed positions.

2. A damper assembly as in claim 1, said damper plates being disposed substantially coplanar to one another and to the bar portion, in a closed position of the damper assembly, and when thus disposed being of a shape substantially corresponding to the cross sectional shape of the conduit portion surrounding the frame and damper plates.

3. A damper assembly as in claim 1, said anchoring means including loops connected to and disposed internally of the conduit through which said end portions of the frame extend, and said anchoring means additionally including abutment portions forming a part of said end portions and having interlocking engagement with said loops for securing the frame immovably in said conduit.

4. A damper assembly as in claim 1, said means pivotally connecting the damper plates to the frame including U-shaped members detachably secured to the frame adjacent said end portions thereof and having legs straddling said frame and extending inwardly thereof, and said damper plates having sleeve portions in which said legs of the U-shaped members are loosely received.

5. A damper assembly as in claim 4, and means constituting parts of said bar portion in which said U-shaped members are clamped for detachably securing the U-shaped members to the frame.

References Cited in the file of this patent

UNITED STATES PATENTS 2,837,991    De Roo _____ June 10, 1958